US007792559B2

(12) United States Patent
Viorel et al.

(10) Patent No.: US 7,792,559 B2
(45) Date of Patent: Sep. 7, 2010

(54) SELF-INSTALLABLE SWITCHABLE ANTENNA

(75) Inventors: Dorin G. Viorel, Calgary (CA); Ronald G. Murias, Calgary (CA); Jagan N. Seshadri, Calgary (CA)

(73) Assignee: Wi-LAN, Inc., Ottawa, Ontario (CA)

( * ) Notice: Subject to any disclaimer, the term of this patent is extended or adjusted under 35 U.S.C. 154(b) by 722 days.

(21) Appl. No.: 11/609,722

(22) Filed: Dec. 12, 2006

(65) Prior Publication Data

US 2007/0173303 A1    Jul. 26, 2007

Related U.S. Application Data

(60) Provisional application No. 60/749,401, filed on Dec. 12, 2005, provisional application No. 60/763,196, filed on Jan. 27, 2006, provisional application No. 60/774,428, filed on Feb. 17, 2006.

(51) Int. Cl.
*H04M 1/00* (2006.01)
(52) U.S. Cl. .................. 455/575.7; 455/13.3
(58) Field of Classification Search ............... 434/754, 434/853, 372; 455/78, 101, 272, 69, 575.7, 455/13.3, 19, 25
See application file for complete search history.

(56) References Cited

U.S. PATENT DOCUMENTS

| 4,062,015 | A | 12/1977 | Litva et al. |
|---|---|---|---|
| 5,065,449 | A | 11/1991 | Gordon et al. |
| 5,117,236 | A | 5/1992 | Chang et al. |
| 5,697,075 | A | 12/1997 | Kim |
| 6,453,176 | B1 | 9/2002 | Lopes et al. |
| 6,907,272 | B2 | 6/2005 | Roy |
| 2005/0090205 | A1* | 4/2005 | Catreux-Erceg et al. ...... 455/78 |
| 2005/0179607 | A1* | 8/2005 | Gorsuch et al. ............. 343/754 |
| 2005/0287962 | A1* | 12/2005 | Mehta et al. ................ 455/101 |

FOREIGN PATENT DOCUMENTS

FR    2 780 584    12/1999

OTHER PUBLICATIONS

Siavash M. Alamouti, "A Simple Transmit Diversity Technique for Wireless Communications", IEEE Journal on Select Areas in Communications, vol. 16, No. 8, Oct 1998.
International Search Report from PCT Patent Application No. PCT/CA2006/001979, dated April 27, 2007.

* cited by examiner

*Primary Examiner*—Tu X Nguyen
(74) *Attorney, Agent, or Firm*—Procopio, Cory, Hargreaves & Savitch LLP

(57) ABSTRACT

A system, method, and apparatus for selecting a set of antennas, for use during operation of a radio system, from a plurality of antennas. The system, method and apparatus may include selecting one antenna that is part of an array of antennas. Then measuring characteristics of radio signals received at the antenna. The selection and measuring of characteristic is repeated for a desired number of antennas in the array. Then, the measurements are combined, and the combinations of antennas are ranked based upon the combined measurement. From the ranking combinations of antennas are selected for use during operation of a radio system.

41 Claims, 8 Drawing Sheets

SELF-INSTALLABLE SWITCHABLE ANTENNA

RELATED APPLICATIONS

This application claims priority to U.S. provisional patent application Ser. No. 60/749,401, filed Dec. 12, 2005, entitled "Design of a System and Method for Switchable Antenna Selection Based on an Optimzed Configuration," and U.S. provisional application Ser. Nos. 60/763,196, filed Jan. 27, 2006, and 60/774,428 filed Feb. 17, 2006, both entitled "Design of a Self-Installable System and Method for Switchable Antenna Selection Based on a Quality Ranking of OFDM and OFDMA Signals" all of which are hereby incorporated by reference in their entirety.

BACKGROUND

1. Field of the Invention

This invention relates to multi-antenna systems for communication systems and more particularly to selection of antenna within a multi-antenna system for use in communication systems.

2. Description of Related Art

A conventional wireless communication system facilitates two-way communication between a plurality of subscriber units and a wireless network infrastructure. Typically the wireless infrastructure is fixed and the subscriber units can be fixed or mobile, or a combination of both fixed and mobile. A typical environment where a wireless network operates includes many structures and obstructions that can block or reflect the wireless signal as it propagates between the subscriber units and the infrastructure. For example, as the signal propagates it may be reflected off of walls, people or other obstacles within the wireless environment. As the signal propagates, and is reflected, it may arrive at a receiver from a different angle than a direct path between the transmitter and receiver.

The wireless environment also changes over time. For example, in a wireless LAN, the obstacles within the environment move, such as people walking, or furniture or equipment being moved. In addition, if the wireless receiver or transmitter are mobile, their movement also changes the location of the obstacle relative to the receiver or transmitter. As the wireless environment changes so does the path that a signal takes as it propagates through the environment. The change in propagation path means that it is unknown what direction the signal will arrive at the receiver from a transmitter.

FIG. 1 is a diagram of an example wireless network 100. As shown in FIG. 1, the wireless network includes a transmitter 102 and a receiver 104. In a typical environment where a wireless network 100 operates there are also obstacles 106. In an outdoor environment, examples of obstacles 106 include people, buildings, cars, trees, etc. In an indoor environment some examples of obstacles 106 include walls, people, furniture, equipment, people, etc. As noted above, the environment also changes over time and the obstacles 106, transmitter 102, or receiver 104, move in relation to each other.

As illustrated in FIG. 1, as the radio signal propagates between from the transmitter 102 and is received at an antenna 120 of the receiver 104 it can be blocked, and reflected by the obstacles 106 in the surrounding environment. The example illustrated in FIG. 1 may be referred to as a non-line of sight (NLOS) propagation environment because the direct line-of-sight (LOS) path 110 is blocked by one of the obstacles 106. Likewise other instances of the signal propagate through the environment, being reflected off of obstacles and traveling various different paths. Four examples of these "multipath" signals 110, 112, 114, and 116 are illustrated in FIG. 1. As shown in the example of FIG. 1, the multipath signals can arrive at the receiver 104 from different directions.

To account for this unknown direction of the receive signal, many wireless devices use an omni direction antenna. While an omni directional antenna can receive signals from any direction, the received signal is not optimal because there is no antenna gain. A directional antenna has antenna gain over an omni antenna but because it is directional it can only receive signals from a particular direction. However, because the wireless environment may be changing a fixed directional antenna may not provide adequate performance.

A technique used to enhance the performance of directional antennas is an antenna switching system. A typical antenna switching system includes multiple antennas, or antenna elements, arranged in a pattern that enables reception of a signal from any direction. With the antenna switching system, individual antenna elements may be selected such that the antenna "Pointed" in the direction of the received signal is selected for use.

Therefore, there is a need for methods and apparatus to optimize antenna selection in a multi-antenna system.

SUMMARY

The systems and methods have several features, no single one of which is solely responsible for its desirable attributes. Without limiting the scope as expressed by the claims which follow, its more prominent features will now be discussed briefly. After considering this discussion, and particularly after reading the section entitled "Detailed Description" one will understand how the features of the system and methods provide several advantages over traditional framing techniques.

In accordance with the invention, it is desirable to optimize an antenna system diversity in Non Line-of-Sight (NLOS) or Obstructed Line-of-Sight (OLOS) propagation environments when two or more receive antennas are employed. In other words, it is desirable to optimize spatial diversity for systems that employ one or more antenna feeds that are operating in heavy multipath fading environments. It is also desirable to provide characteristics of omni-directional antenna coverage in NLOS or OLOS environments while also increasing the system gain. The system is self-installable in customer premises equipment (CPE) or Subscriber Station (SS), especially in NLOS environments where a direct antenna alignment is not possible by optical means. The system is also adaptive to support antenna alignment for time-varying NLOS or OLOS propagation environments.

In one aspect, a method of selecting a combination of antennas from a plurality of antennas includes selecting one antenna that is part of an array of antennas. Then measuring characteristics of radio signals received at the antenna. The selection and measuring of characteristic is repeated for a desired number of antennas in the array, then the measurements are combined and ranked. From the ranking a combination, or set of combinations, of antennas are selected for use during operation of a radio system.

The radio signals may be orthogonal frequency division multiplexed (OFDM) signals. Also, measuring characteristics of the radio signal includes, for example, measuring a degree of correlation of an amble (a preamble, midamble, or a postamble) in the signal to a known amble, combining signals received from two or more antennas and then measuring a degree of correlation of an amble in the combined signal to a known amble, measuring an error vector measurement, a signal to noise ratio, a carrier to signal ratio, or a signal fade measurement.

In another aspect, an antenna system includes a plurality of antennas. The system also includes a switch matrix in communication with the plurality of antennas and adapted to couple a selected antenna to a switch output. A radio module is in communication with the switch output and adapted to receive radio frequency signals. There is a measurement module in communication with the radio module, the measurement module is adapted to measure characteristics of the radio frequency signals received by the radio module. And a control module that is adapted to receive the measured characteristics and to control selection of which of the plurality of antennas is coupled to the switch output of the switch matrix.

The control module can select antennas one at a time, or simultaneously, and rank the antennas based upon a combination of the measurements of the individual antennas. Then the control module selects a combination of antennas, or a set of antennas combinations, for use during an operational phase based upon the rankings. The antenna system can also include a second switch output, and a second radio module in communication with the second switch output. In this configuration, the control module selects one antenna, or set of antennas whose signals are combined, to be communicatively coupled to the first radio module and a second antenna, or set of antennas whose signals are combined, to be communicatively coupled to the second radio module. Any desired number switch outputs and radios can be used.

Other features and advantages of the present invention should be apparent from the following description which illustrates, by way of example, aspects of the invention.

DETAILED DESCRIPTION

After reading this description it would become apparent to one skilled in the art how to implement the invention in various alternative embodiments and alternative applications. However, although various embodiments of the present invention will be described herein, it is to be understood that these embodiments are presented by way of example only, and not limitations. As such, this detailed description of various embodiments should not be construed to limit the scope or breadth of the present invention.

It is desirable to optimize an antenna systems diversity in Non Line-of-Sight (NLOS) or Obstructed Line-of-Sight (OLOS) propagation environments when two or more receive antennas are employed. In other words, it is desirable to optimize spatial diversity for systems that employ one or more antenna feeds that are operating in heavy multipath fading environments. It is also desirable to provide characteristics of omni-directional antenna coverage in NLOS or OLOS environments while also increasing the system gain. The system should be self-installable in customer premises equipment (CPE) or Subscriber Station (SS), especially in NLOS environments where a direct antenna alignment is not possible by optical means. There is also a need for adaptive antenna alignment for time-varying NLOS or OLOS propagation environments.

Figure 2:
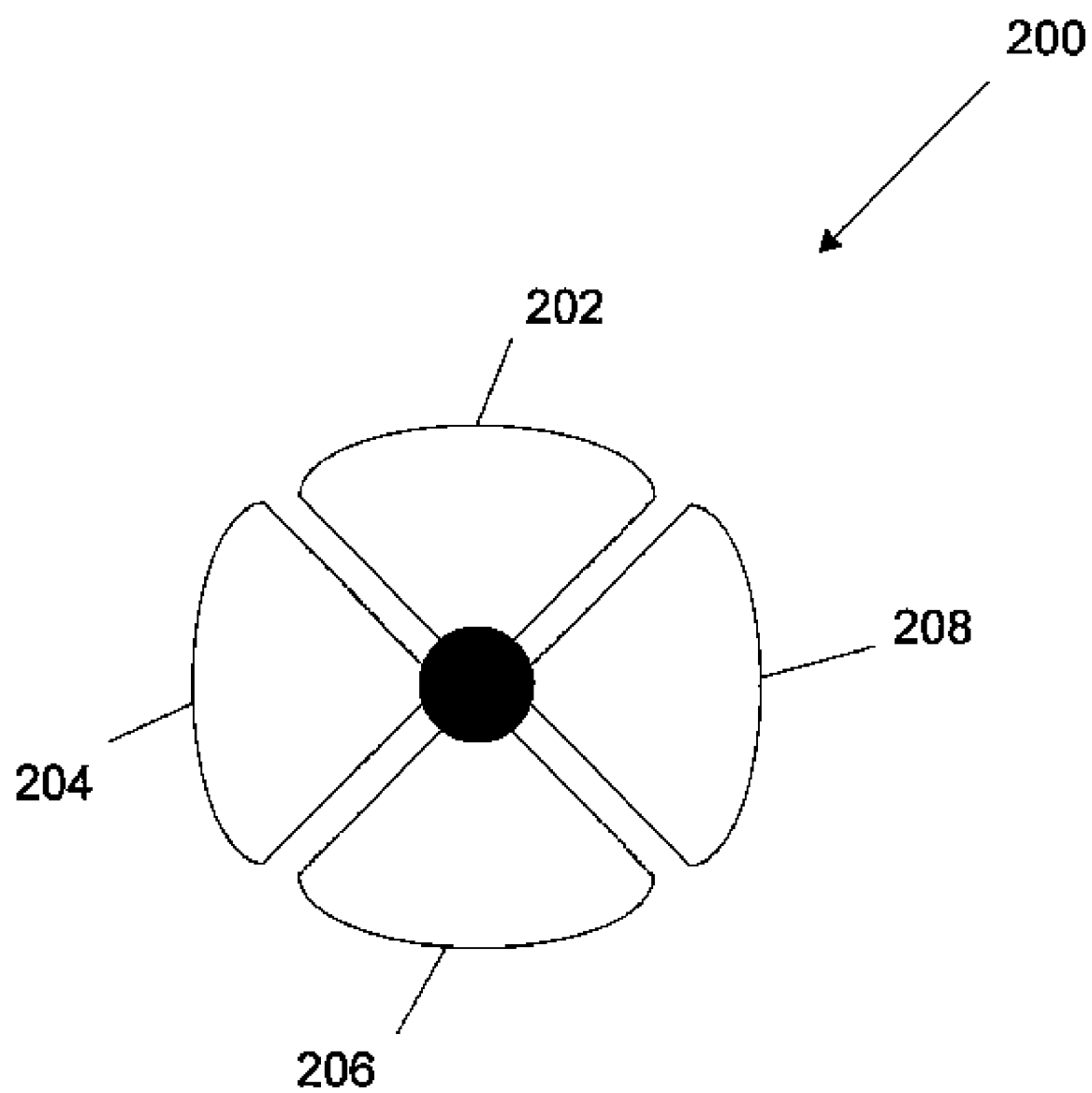
FIG. 2 is a diagram of an example multi-antenna module that can be used at a receiver.

FIG. 2 is a diagram of an example multi-antenna module 200 that can be used at a receiver. In the example antenna module 200 shown in FIG. 2, there are four directional antennas 202, 204, 206, and 208, each configured to receive or transmit signals in approximately a 90 degree sector. Selection which of the antennas 202, 204, 206, and 208, to activate during operation of a radio system, such as during reception or transmission of signals can improve the performance of the radio system.

Figure 1:
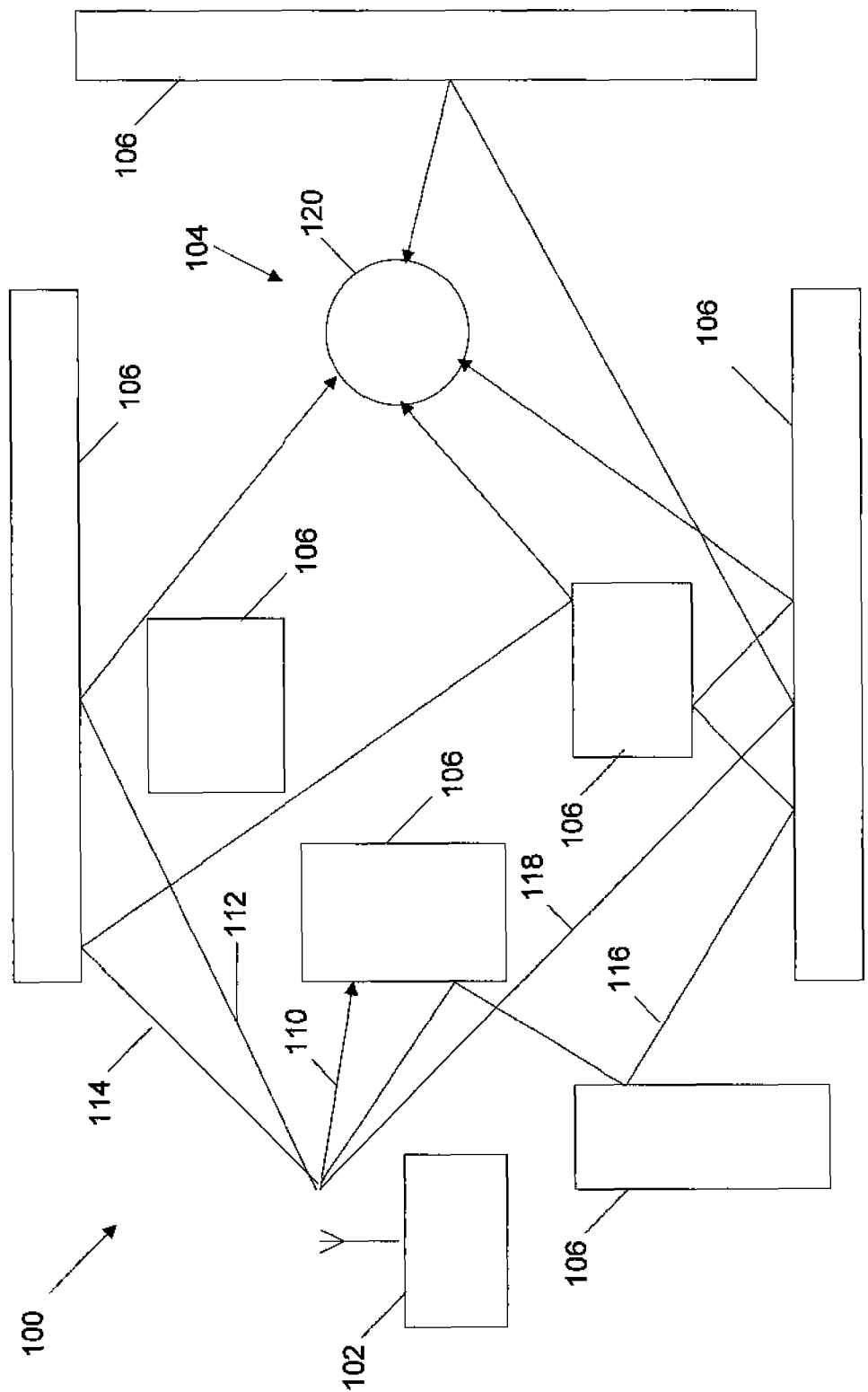
FIG. 1 is a diagram of an example wireless network.
Figure 3:
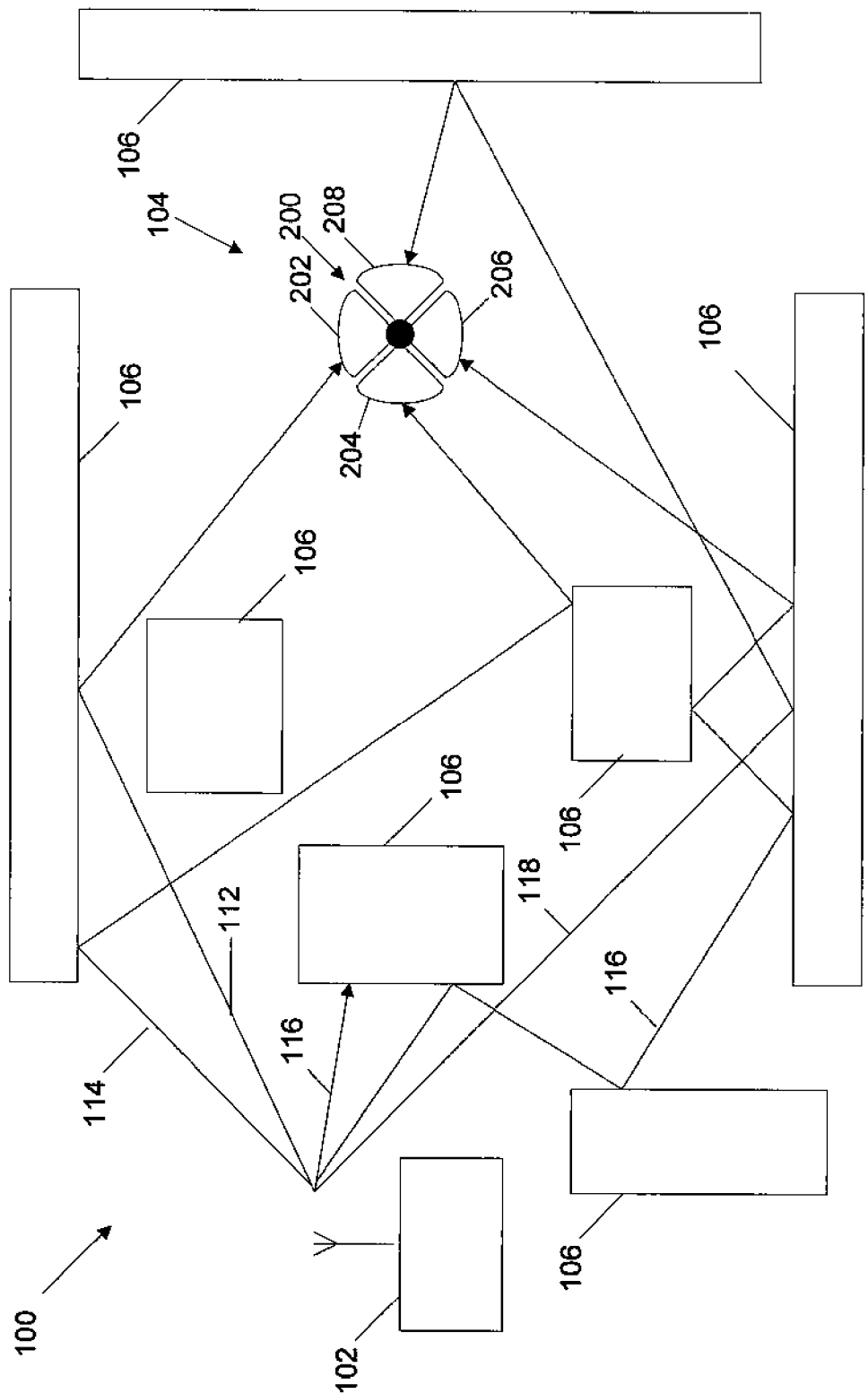
FIG. 3 is a diagram of a wireless network illustrating aspects of the invention.

FIG. 3 is a diagram of a wireless network illustrating aspects of the invention. FIG. 3 is similar to FIG. 1, with the antenna 120 at the receiver 104 replaced with the antenna module 200 of FIG. 2. In the example of FIG. 3, the multipath signals 112, 114, 116, and 118 that arrive at the antenna module 200, arrive at different antennas 202, 204, 206, and 208 of the antenna module 200. Because the multipath signals 112, 114, 116, and 118 are typically of differing "quality" it may be preferred to receive selected versions of the multipath signals, and discard the others. For example, the multipath signal 112 is only reflected once before it is received at antenna 202, while multipath signal 116 is reflected five times before it is received at antenna 206. Likewise multipath signals 114 and 118 are reflected twice before being received at antennas 204 and 208 respectively.

Because the multipath signals 112, 114, 116, and 118 each travel different paths they will generally undergo differing amounts of degradation or distortion. For example, multipath signal 112 may undergo the least degradation because it is only reflected once. While multipath signals 114 and 118 are both reflected twice, multipath signal 114 may undergo less degradation because it travels a shorter overall path length than multipath signal 118. And, multipath signal 116 may undergo the most degradation because it is reflected five times. Because the multipath signals arrive at the antenna after undergoing differing amounts of degradation the signals will be of different "quality." Thus, it may be preferred to only activate selected antennas and deactivate other antennas.

Figure 4:
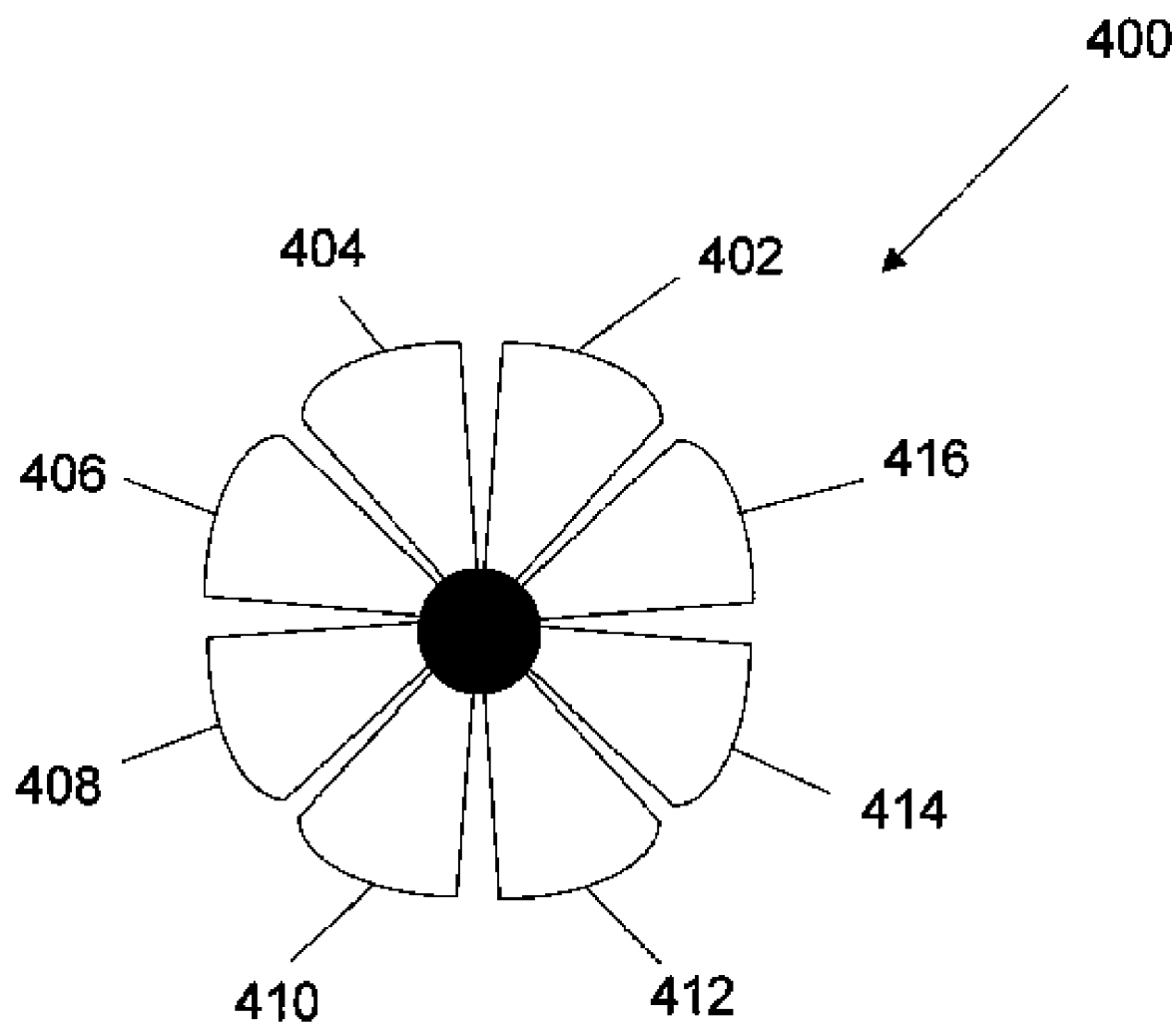
FIG. 4 is a diagram of another example multi-antenna module that can be used at a receiver.

FIG. 4 is a diagram of another example multi-antenna module 400 that can be used at a receiver. In this example antenna module 400, the antenna system includes eight directional antennas 402, 404, 406, 408, 410, 412, 414, and 416 each configured to receive signals from approximately a 45 degree sector. Selection of which of the antennas are active can improve the performance of a receiver. Each of the antennas in antenna module 400 cover a small sector thereby increasing the antenna gain over the antennas in antenna module 200 of FIG. 2. While FIGS. 2 and 4 illustrated four antennas and eight antennas, any desired number of antennas may be used.

Multi-antenna modules, such as illustrated in FIGS. 2 and 4 also provide spatial diversity. Using spatial diversity, incoming signals from two or more spatially diverse antennas are combined mathematically to produce a signal that is of better quality than either of the two individual signals from the antennas. A selectable antenna array can be used to optimize spatial diversity while also enabling a user-installable antenna. The selection criteria may be based on choosing an optimal pair, or set, of receive antennas which will maximize the performance of the combining scheme.

Figure 5:
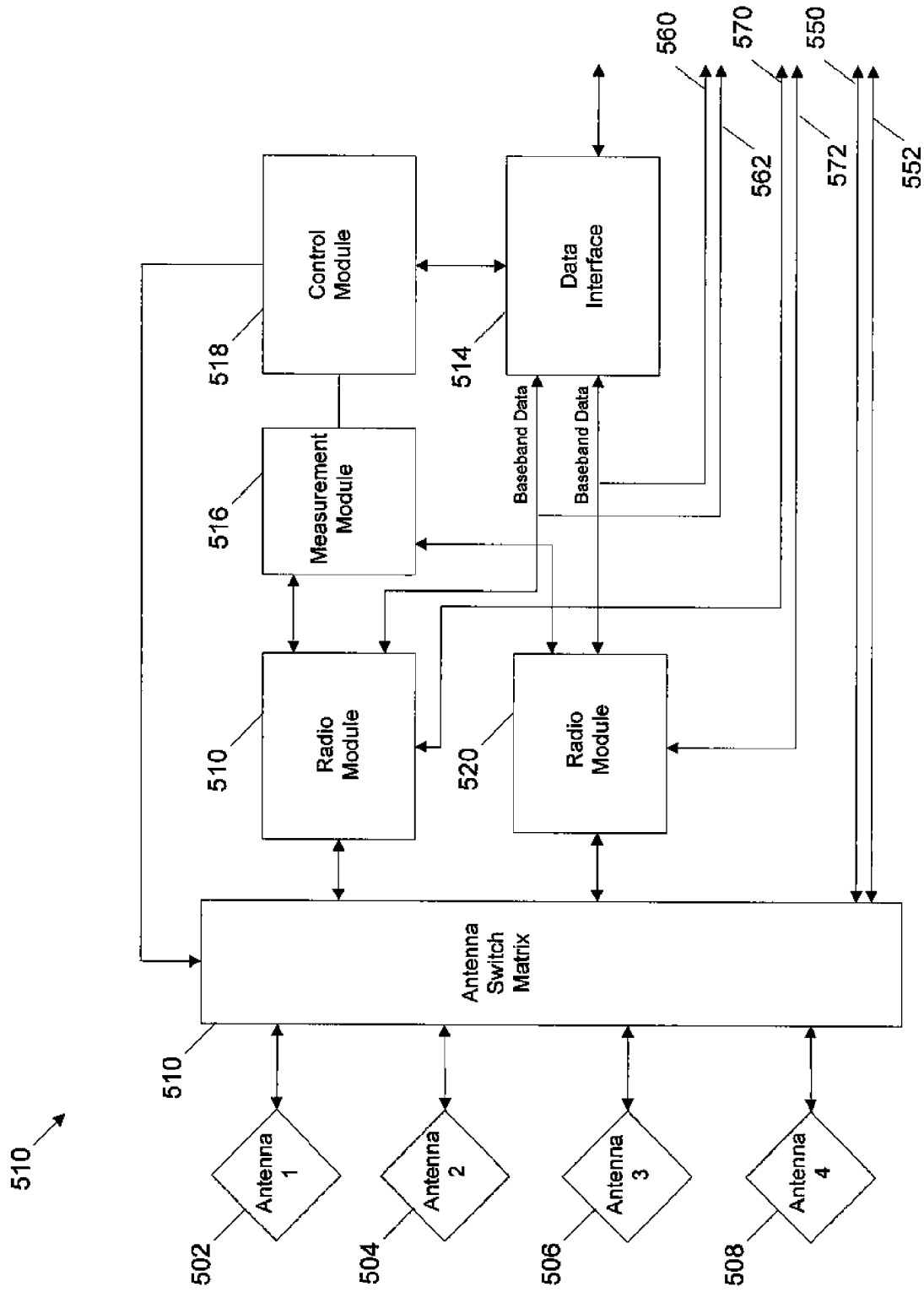
FIG. 5 is a functional block diagram of an embodiment of an antenna system.

FIG. 5 is a functional block diagram of an embodiment of an antenna system 500. The antenna system 500 can support MIMO (multiple-in multiple-out) technology. The antenna system 500 includes a plurality of configurable antennas 502-508. Although four configurable antennas are depicted, more or fewer such elements can be used. An antenna switch matrix 510 communicatively couples selected antennas 502-508 to a radio module 512.

The radio module 512 receives radio frequency (RF) signals from the selected antenna 502-508, demodulates the received signal and communicates a baseband signal to data interface module 514. The radio module 512 also receives baseband signals from the data interface module 514, modulates the baseband data and communicates an RF signal to the selected antenna 502-508. The radio module 512 is also communicatively coupled to a measurement module 516. As described further below, the measurement module 516 evaluates characteristics of the signal received by the radio from the selected antenna For example, the measurement module 614 may determine the power level, or degree of correlation, or other characteristic of the received signal.

In one embodiment, during a selection operation of the antenna system, signals from desired antennas 502-508 are communicated to the radio module 512. An output of the radio module is in communication with the measurement module 516. For example, signals from each available antenna 502-508 can be communicated, one at a time, to the radio module 512 where the signal is communicated to the measurement module 516. The measurement module 516 analyzes the received signal to determine a "quality" of the signal. In one example, each antenna signal is communicated to the radio module 512 for a period long enough to capture at least an amble (preamble, postamble, midamble) from the signal received from the respective antenna. The measurement module 516 then analyzes the signal to determine its quality by measuring the degree of correlation of the received amble(s) with known reference amble signal(s). The amble correlation can be used as a criterion for received signals assigned to the same transmitter, or base station, for ranking the quality of the antenna feeds. A Base Station Identification (BSID) may be used to make a decision between two received signals with the same degree of amble correlation, transmitted by different base stations or peer subscriber stations (SS).

The measurement module 516 communicates the determined signal quality for each antenna selected to control module 518. The control module 518 communicates with the antenna switch matrix 510 to selective couple a desired antenna to the radio module 512. As described further below, the control module 518 evaluates the signal quality received from the measurement module 516 for each antenna 502-508 selected. After evaluating a desired number of antennas 502-508, the control module 518 can select antennas to couple to radio modules 512 and 520 during operation. It is noted that the control module 512 also controls the antenna switch matrix to selectively couple the antennas 502-508 to the radio module 512 during the selection phase.

The control module 518 evaluates various combinations of antenna signals to determine preferred antenna combinations. As described further below, the control module 518 uses various analysis techniques to evaluate which combination of antenna signals provides a preferred characteristic, for example, the "flattest" response. In one embodiment, the various combination of antenna signals are raked by determining a "measurement" of the combinations' performance relative to other combinations. Table 1 below is an illustrative example of possible rankings for five antenna array where it is desired to determine the optimal combination of two antennas within an array of five antennas. In Table 1, a value closer to "1"represents enhanced performance over a value closer to "0."

TABLE 1

|  | Antenna 1 | Antenna 2 | Antenna 3 | Antenna 4 | Antenna 5 |
| --- | --- | --- | --- | --- | --- |
| Antenna 1 |  | 0.8 | 0.9 | 0.3 | 0.1 |
| Antenna 2 | 0.8 |  | 0.3 | 0.3 | 0.2 |
| Antenna 3 | 0.9 | 0.3 |  | 0.2 | 0.4 |
| Antenna 4 | 0.3 | 0.3 | 0.2 |  | 0.6 |
| Antenna 5 | 0.1 | 0.2 | 0.4 | 0.6 |  |

The values listed in Table 1, which are merely illustrative, show that in this example the combination of signals from antennas 1 and 3 are preferred over the other combinations of antennas. The example illustrated in Table 1 evaluated the combinations of only two antennas. In other examples, any number of desired antennas may be combined and the combinations evaluated for performance.

Returning to FIG. 5, signals from each of the desired antennas 502-508 can be sampled, one at a time, and then the samples combined to evaluate the performance of the combination. In another embodiment, samples from multiple antennas may be sampled at the same time, and then the samples combined to evaluate the performance of the combination. For example, if combinations of two antennas are being evaluated, then using a second radio module 520 in addition to the first radio module 512, two antennas can be sampled simultaneously. For example a first antenna 502 signal can be communicated to the first radio module 512 while at the same time a second antenna 506 signal can be communicated to the second radio module 520. The radio signals from the two radio modules 512 and 520 can be communicated to the measurement module 516 where a quality of the two signals is determined and communicated to the control module 518. While the example shown in FIG. 5 has only two radio modules, any desired number of radio module may be used to acquire a desired number of samples simultaneously.

The antenna system 500 can be selectively configured in response to control signals to create different antenna configurations which can include different antenna patterns. By selecting one or more antennas 502-508, the antenna system can direct or steer the gain of the overall antenna system 500.

A system can require one receive antenna feed like in Multiple In Single Out (MLSO) or Space Time Coding (STC) 2×1 selection spatial diversity configurations or two or more receive feeds like in Multiple In Multiple Out (MIMO) or STC 2×2 receive configurations. During an operational phase, depending on whether the system requires a single antenna feed or multiple antenna feeds, the highest-ranking antenna feeds determined during the selection phase can be enabled and the other antennas in the array disabled. If the system is a multiple antenna system, combining techniques can be applied to the plurality of signals to form an input signal for the receiver.

For example, in a NLOS environment the direction of the best performance Radio Frequency (RF) energy is unknown due to the multiple reflections and/or diffractions. As illustrated in FIG. 3, the "best" performance RF signals could arrive at the receiver from unpredictable directions. Therefore 360 degrees of antenna coverage is desirable. However, using an omni directional antenna may not be an optimal solution considering the low antenna gain associated with this type of antenna. Therefore, sectorized coverage may be used to help optimize the system gain, using spatial combining schemes. Returning to FIG. 3, the antenna system 200 includes four antennas 202-208, each having a 90 degree horizontal coverage pattern. The received signals that offer the best spatial combining performance could be received, for example, on the antennas 202 and 206 aligned opposite to each other, or any other combination of antennas.

System gain can be increased further if more complex antenna systems are employed. For example, using an eight-antenna system 400 as illustrated in FIG. 4 can provide increased gain. As an example, the best RF signals could be received on the antennas 404 and 414 each having a 45 degree horizontal coverage pattern and a corresponding increase in gain. Although the examples illustrated in FIGS. 2 and 4 shown antenna arrays with each antenna in the array having the same coverage pattern, other configurations are possible. For example, an antenna system can include antennas with differing coverage patterns such as some elements having 90 degree coverage patterns and other antennas having 45 degree coverage pattern, or any other combination of desired coverage patterns.

In addition, the selection phase, or process, may be used periodically to account for changes in the propagation environment and the related signal degradation as monitored by an upper layer application (Data Link Layer). For example, an environment that has a high rate of change may require a higher antenna re-selection rate be used than that required in a fixed environment.

Using the techniques for antenna selection described can significantly improve the operation of RF systems operating in heavy NLOS multipath environments. For example, if a multiple antenna system is an array of 90-degree sector antennas, the gain is typically 10-12 dB higher than a single omni antenna, based on the H polarity gain difference for the same vertical beam angle of the corresponding radiation pattern. It should be noted that insertion losses in an antenna switch used to select an antenna could degrade the receiver's related noise figure and therefore lower the system gain. The expected system gain improvement is:

$$\Delta SysGain = G_{H\_90deg} - G_{H\_OMNI} - L_S \quad \text{Equation 1}$$

where:

$\Delta SysGain$: is the system gain difference between the SS operation based on selection of a 90 degree sector antenna and an omni-directional antenna with the same vertical angle of the corresponding radiation pattern.

$G_{H\_90deg}$: is the horizontal antenna gain for a 90 degree sectorial antenna based on a same vertical radiation pattern angle, expressed in dBi.

$G_{H\_OMNI}$: is the horizontal antenna gain for an omni-directional antenna based on the same vertical radiation pattern angle, expressed in dBi.

$L_S$: is the aggregate insertion losses for the operational frequency of the antenna switch, expressed in dB.

Using Equation 1, in one example where $G_{H\_90deg}$=14 dBi, $G_{H\_OMNI}$=4 dBi and $L_s$=2dB, the expected delta system gain improvement is:

$$\Delta SysGain >= 8 \text{ dB}$$

Various other techniques can be used to determine which antenna, or set of antennas to select. For example, one technique is to examine a signal from each antenna individually. An amble signal can be compared with a known amble signal by a correlation process. Then a measure of correlation for each antenna is used to compare performance of the individual antennas and to select the one, two, or more "best" candidates for selection. If there are M antennas available in the system, then there would be M correlation operations.

In one embodiment, cross-correlation of the incoming signal against a known sequence is performed. The cross-correlation operation results in a peak corresponding to the quality of the incoming amble signal. In the example where two signals are to be used, the tallest two peaks are used. Another property of the correlation technique is that multipath reflections result in secondary, tertiary, and sometimes other correlation peaks. Detection of significant peaks outside of the expected correlation peak indicate strong multipath and could be used to rule out a given element. In one example, selection could be performed by measuring the normalized magnitude of the main correlation peak, then measuring the magnitude of the next largest peak and recording the difference. Correlation for a single element is performed as follows:

$$y(m) = \sum_{n=0}^{N-m-1} x_{n+m} y_n^* \quad \text{Equation 2}$$

where N is the length of the correlation sequence.

The peak value is detected and a normalization process is used to ensure comparison between elements is on the same scale. This results in a single numerical value that represents element signal quality based on correlation. For single-output applications, the element with the highest numerical value is selected.

Another technique that can be used to determine which antenna, or set of antennas, to select combines the received signals from two or more elements before performing the correlation measurement. The correlations from different combinations are then used to determine the "best" candidate combinations for selection, In this scenario, if there are M antennas available in the system and N output streams, this requires $_MC_N$ correlation operations. For example, if there is an eight antenna array, and it is desired to select one two antenna set, then there would be 28 correlation operations.

Still other techniques for determining which antenna, or set of antennas, to select may be based on the time domain signal for a simple determination of "best" antenna combination in an array. For example, evaluation various antenna combinations to determine characteristics of the combination, such as, average received power of the incoming signal, signal-to-noise ratio (SNR), etc.

In addition, using properties of an Orthogonal Frequency Division Multiplex (OFDM) signal, antenna comparisons may be made in the frequency domain. For example, an amble sequence from each antenna may be converted to the frequency domain using a discrete Fourier transform (DFT) or some other equivalent process. The quality of the signal may then be determined using, for example, an error vector magnitude measurement, signal-to-noise ratio (SNR), carrier-to-signal ratio (CIR), signal fade measurement, or some other metric or combination of metrics. Two or more "best" candidates can then be selected based on the determined quality of the signal. Using this technique, if there are M antennas available in an array, then there would be M frequency domain measurement operations.

As with the above frequency domain signal performance measurements, an amble sequence can be converted to the frequency domain using a discrete Fourier transform (DFT) or some other equivalent process. If there are M input array antennas and N required output streams, N combinations of the M input streams are combined before the frequency domain signal is measured. The quality of the signal can then be measured, for example, using an error vector magnitude measurement signal-to-noise ratio (SNR), carrier-to-signal ratio (CIR), signal fade measurement, or some other metric or combination of metrics. Two or more "best" candidates can be selected based on these results. If there are M antennas available in the array and N required output streams, is requires $_MC_N$ frequency domain measurement operations.

For example, if the signal is transmitted during two time frames as illustrated in Table 2:

TABLE 2

|  | Tx Antenna 0 | Tx Antenna 1 |
|---|---|---|
| Time t | $s_0$ | $s_1$ |
| Time t + T | $-s_1^*$ | $s_0^*$ | the notation for the received signals at the two receive antennas are listed in Table 3:

TABLE 3

|  | Rx Antenna 0 | Rx Antenna 1 |
|---|---|---|
| Time t | $r_0$ | $r_2$ |
| Time t + T | $r_1$ | $r_3$ |

In a two-antenna receiver system, the values $r_{0-3}$ are combined to recover the original $s_0$, $s_1$ values transmitted. The invention can be used to select a combination of antennas with optimal signals for use with the space-time receiver. To do this, the amble signals $r_0$, $r_1$, from one element and $r_2$, $r_3$ from a second element are combined to get an estimated $s_0$, $s_1$ signal. The combing process follows techniques described by S. Alamouti, in "A Simple Transmit Diversity Technique for Wireless Communications," *IEEE Journal on Select Areas in Communications*, Oct. 1998, pp 1451-1458, incorporated by reference herein.

An error vector magnitude measurement is taken to create a numerical value for the quality of the selected element combination. This process is repeated for the other possible array combinations and the highest quality combination (lowest total error vector magnitude) is selected.

To improve the coherence of mixed array antenna signals, a relative feed delay can be calculated, for example, using the results of the time domain correlation of each signal or phase detection/correction circuitry in the frequency domain. Delay circuitry before the DFT or phase rotation circuitry following the DFT could be used to align the timing or phase of the signals prior to combining them. For example, if an antenna system includes a four-antenna array, similar to the array illustrated in FIGS. 2 and 5 above, then one or more antennas with "strong" signals can be selected to feed a receiver, and there would be an increase in system gain because directional antennas have more gain than an omni directional antenna.

In one example, a channel estimate is performed in the frequency domain using the amble. Timing/phase adjustments are made to the incoming signals based on phase error measurements. The signal is transformed to the frequency domain, and parts of the bandwidth under fade are noted for each antenna. Antenna elements are selected and combined (in the frequency domain) based on their ability to complement each other. The fade measurement process includes measuring the magnitude of the signal in each frequency bin and storing a vector containing the values for each element. Next, the antenna combinations are compared by summing the vectors for two candidates and calculating the variance for the resulting sum vector. In the case of a 4×4 array, the combination of two elements with the lowest variance is selected. This results in two streams of two combined elements.

For a four-element array (using A . . . D to designate each of the four elements), the following comparisons are made:

$$\min(\mathrm{var}(A+B),\mathrm{var}(A+C),\mathrm{var}(A+D),\mathrm{var}(B+C),\mathrm{var}(B+D),\mathrm{var}(C+D)) \quad \text{Equation 3}$$

where "min" is the minimum function, and "var" is the variance calculation:

$$\sigma^2 = \frac{1}{N}\sum_{i=1}^{N}(x_i - \bar{x})^2 \quad \text{Equation 4}$$

In another example, any number of desired antennas in an array, including all of the antennas, can be selected and their respective phases, or timing, adjusted to create a signal to feed a receiver. For example, using the example above of a four-antenna array, if a signal is transmitted and received by a first antenna in the array, it will have a first phase shift depending, at least in part, on the path the signal travels to the antenna. If a second antenna of the array receives the transmitted signal, and the signal follows a different path than the signal to the first antenna, then the signal received at the second antenna will have a second phase shift that is typically different than the first phase shift. If an omni directional antenna were used in this example, the differing phase shifts of the multipath signals received would cause fades. Using the antenna system described herein, adjustment of the phases, or timing, of signals received at different antennas can result in a signal, to feed to the receiver, that is of better quality and reduces, or eliminates, fades.

In one embodiment, timing/phase correction can be applied. In one example, alignment is performed on combined signals to reduce fades caused by phase mismatch. Rough timing correction can be calculated from the location of the correlation peak in the time domain; phase detection/correction can be performed in the frequency domain. Both calculations can be done on the amble signal.

Returning to the example of FIG. 5, the antenna system includes four antennas 502-508 and two radios 512 and 520. In other embodiments different numbers of antennas and radios can be used. In addition, the data interface 514 can receive baseband data and convert it into data packets to be communicated to another system (not shown). Likewise, the data interface 514 can receive data packets from another system and convert it to baseband data to be communicated to the radio modules 512 and 520. In addition, the data interface 514 can be configured to communicate baseband data, intermediate frequency (IF) signals, or RF signals, to and from another system.

In other embodiments, other forms of the signals can be provided to a receiver in another system. For example, if it is desired to provide "raw" RF signals from the antennas to the receiver, the antenna signals 550 and 552 can be communicated from the antenna switch matrix 510 to the other system. This example illustrates an example where there are two raw RF signals communicated to the other system. In other examples, any desired number of raw RF signals can be provided to another system. In addition, if it is desired to provide baseband data from selected antennas to another system, baseband signals 560 and 562 can be provided to the other system. In the example of FIG. 5, baseband signals from the two radio modules 510 and 520 are provided to the other system, in other examples with additional radio modules, additional baseband signals can be provided to another system. In yet another example, after the antenna signal has been transformed from the time domain into the frequency domain, such as in the radio modules 510 and 520, the "raw" frequency domain signals 570 and 572 can be provided to the other system. In a like manner, raw RF signals, baseband signals, or raw frequency domain signals may also be received from a transmitter in the other system and used to radiate signals from selected antennas 502-508.

In one example, during an operational phase, a first antenna may be in communication with the first radio module 510, and a second antenna may be in communication with the second radio module 520. The antenna signals may be demodulated by the radio modules 510 and 520 and baseband data may be communicated to the data interface 514 where the two antenna signals are combined and a combined signal output from the data interface 514. The combined signal output by the data interface 514 can be baseband data, intermediate frequency (IF) signals, or RF signals.

Replacement of a conventional antenna with an antenna system such as the antenna system 500 in FIG. 5 can improve the performance of existing systems. For example, if an existing system uses an omni-directional antenna, the omni-directional antenna can be replaced with a multi-antenna system that can select antennas that provide improved performance over the omni-directional antenna. Referring to FIG. 5, the interface between the antenna system 500 and an existing system can be at different points in the signal flow. For example, data can be communicated between the antenna system 500 and the existing system at the data interface 514. In addition, baseband data can be communicated between the radio modules 512 and 520 and the existing system. Likewise RF signals can be communicated between the antenna switch matrix 510 and the existing system.

Figure 6:
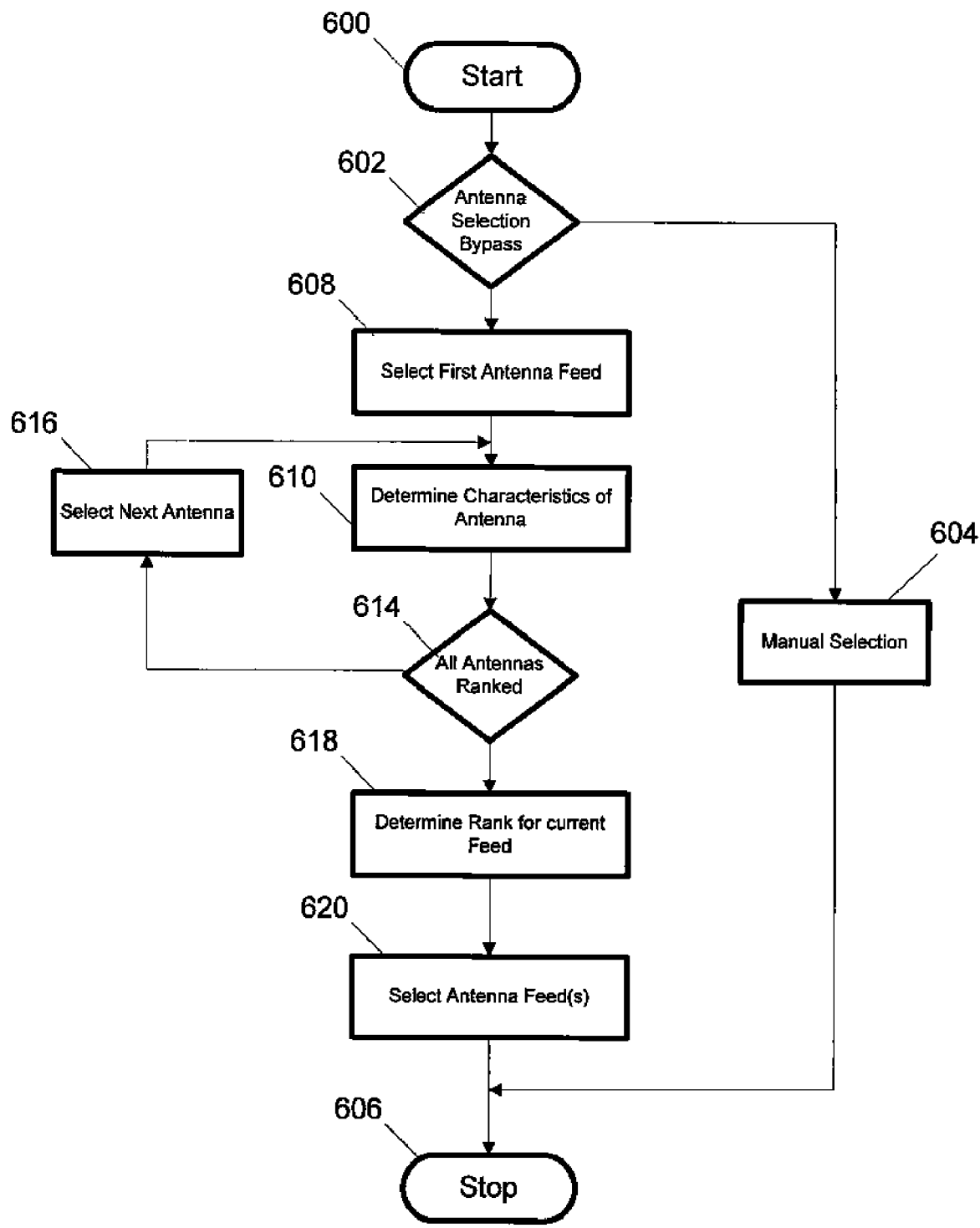
FIG. 6 is a flow diagram illustrating selection of antennas in a multi-antenna array.

FIG. 6 is a flow diagram illustrating selection of antennas in a multi-antenna array. Flow begins in block 600. Flow then continues to bock 602 where it is determined if it is desired to bypass the automatic selection process. If it is desired to bypass the automatic selection process flow continues to block 604 where antennas are manually selected. And flow continues to block 606 and stops.

Returning to block 602, if it is desired to automatically select antennas flow continues to block 608 and the first antenna is selected. Flow then continues to block 610 where characteristics of signals received by the selected antenna are determined. Flow continues to block 614 where it is determined if all of the desired antennas have been evaluated. If all of the desired antennas have not been ranked, then flow continues to block 616 where another antenna is selected and flow continues to block 610. Returning to block 614, if all of the desired antennas have been ranked, flow continues to block 618 and the characteristics of various combinations of antennas are combined and the combinations evaluated and ranked. Flow then continues to block 620, and in response to the ranking, a preferred combination of antenna elements is selected for an operation phase. Flow then continues to block 606 and stops.

Another example illustrating advantages to using frequency domain combining is illustrated below. Table 4 illustrates an example set of values representing magnitudes of the bins sampled from four antennas, A-D.

TABLE 4

| | Bin Magnitudes | | | | | | | | | | | |
|---|---|---|---|---|---|---|---|---|---|---|---|---|
| A | 50 | 55 | 48 | 60 | 72 | 60 | 50 | 40 | 30 | 20 | 25 | 27 |
| B | 30 | 20 | 25 | 27 | 28 | 29 | 35 | 35 | 40 | 51 | 52 | 60 |
| C | 60 | 70 | 66 | 65 | 48 | 47 | 46 | 50 | 30 | 20 | 25 | 27 |
| D | 30 | 20 | 25 | 27 | 28 | 29 | 35 | 35 | 40 | 51 | 52 | 35 |

Table 5 shows values illustrating a measure of performance for various combinations of the antennas. In this example the values of the combinations are determined by adding the bin magnitudes for combinations of two antennas and then averaging the magnitudes. For example, the combination of antennas A and B in the first bin is (50+30)/2=40. Other techniques for combining the bin magnitudes are also possible.

TABLE 5

| | | | | | | | | | | | |
|---|---|---|---|---|---|---|---|---|---|---|---|
| A + B | 40 | 37.5 | 36.5 | 43.5 | 50 | 44.5 | 42.5 | 37.5 | 35 | 35.5 | 38.5 | 43.5 |
| A + C | 55 | 62.5 | 57 | 62.5 | 60 | 53.5 | 48 | 45 | 30 | 20 | 25 | 27 |
| A + D | 40 | 37.5 | 36.5 | 43.5 | 50 | 44.5 | 42.5 | 37.5 | 35 | 35.5 | 38.5 | 31 |
| B + C | 45 | 45 | 45.5 | 46 | 38 | 38 | 40.5 | 42.5 | 35 | 35.5 | 38.5 | 43.5 |
| B + D | 30 | 20 | 25 | 27 | 28 | 29 | 35 | 35 | 40 | 51 | 52 | 47.5 |
| C + D | 45 | 45 | 45.5 | 46 | 38 | 38 | 40.5 | 42.5 | 35 | 35.5 | 38.5 | 31 |

Various statistical techniques can be used to evaluate the combinations to determine, for example, a ranking of the various combinations. Table 6 below illustrates an example analysis of the combinations illustrated in Table 5.

TABLE 6

| | Var | Min | Max | Avg |
|---|---|---|---|---|
| A + B | 36.6 | 35 | 58.5 | 46.2 |
| A + C | 134 | 20 | 62.5 | 46.2 |
| A + D | 96.3 | 31 | 71 | 46.2 |
| B + C | 74.4 | 35 | 72 | 46.2 |
| B + D | 134 | 20 | 62.5 | 46.2 |
| C + D | 72.3 | 31 | 62.5 | 46.2 |

Figure 7:
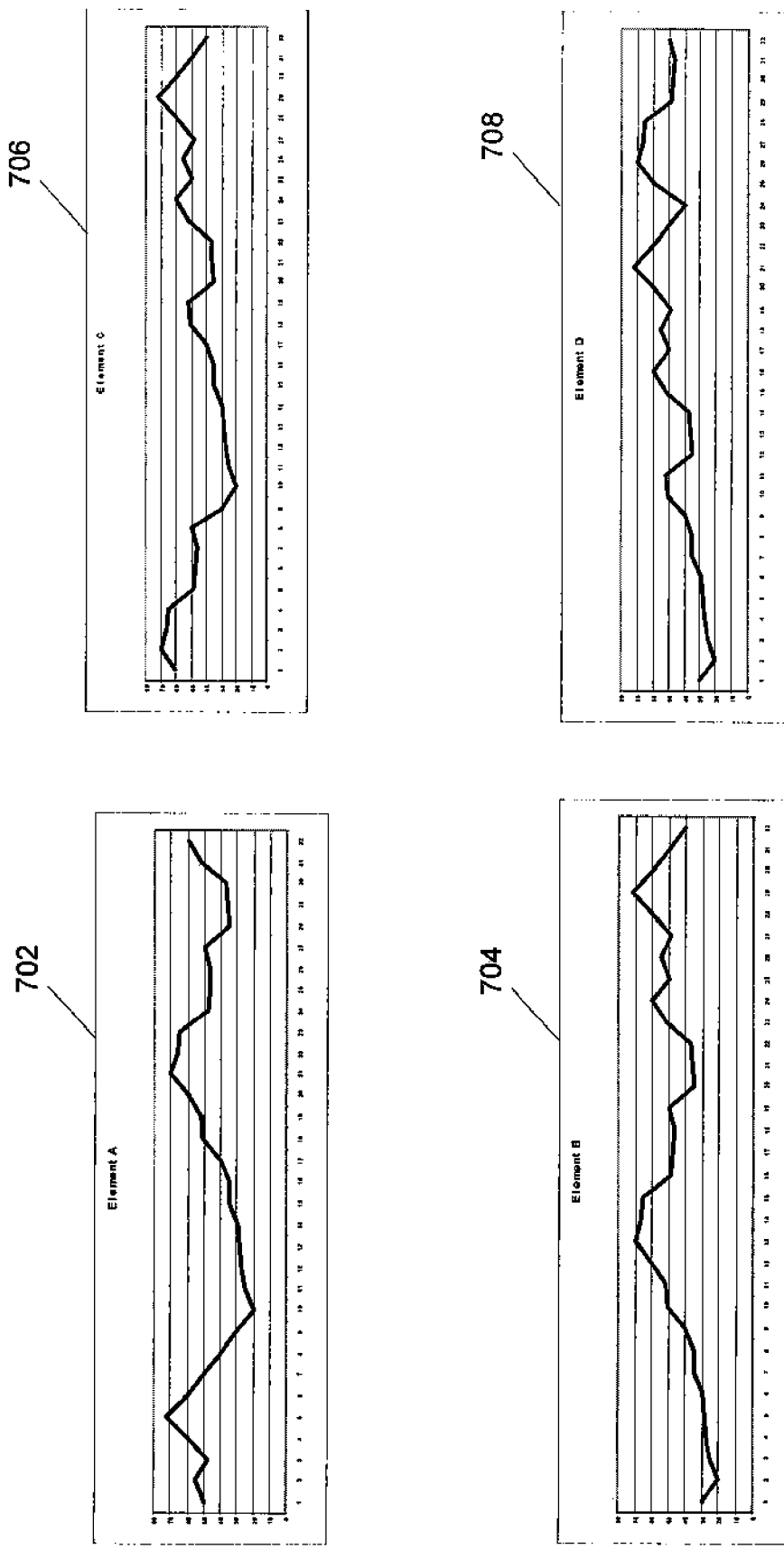
FIG. 7 is a set of charts graphically illustrating the relative "performance" of the individual antennas.

FIG. 7 is a set of charts graphically illustrating the relative "performance" of the individual antennas listed in Table 5. As shown in FIG. 7, the bin magnitudes for antenna A 702, antenna B 704, antenna C 706, and antenna D 708 are plotted.

Figure 8:
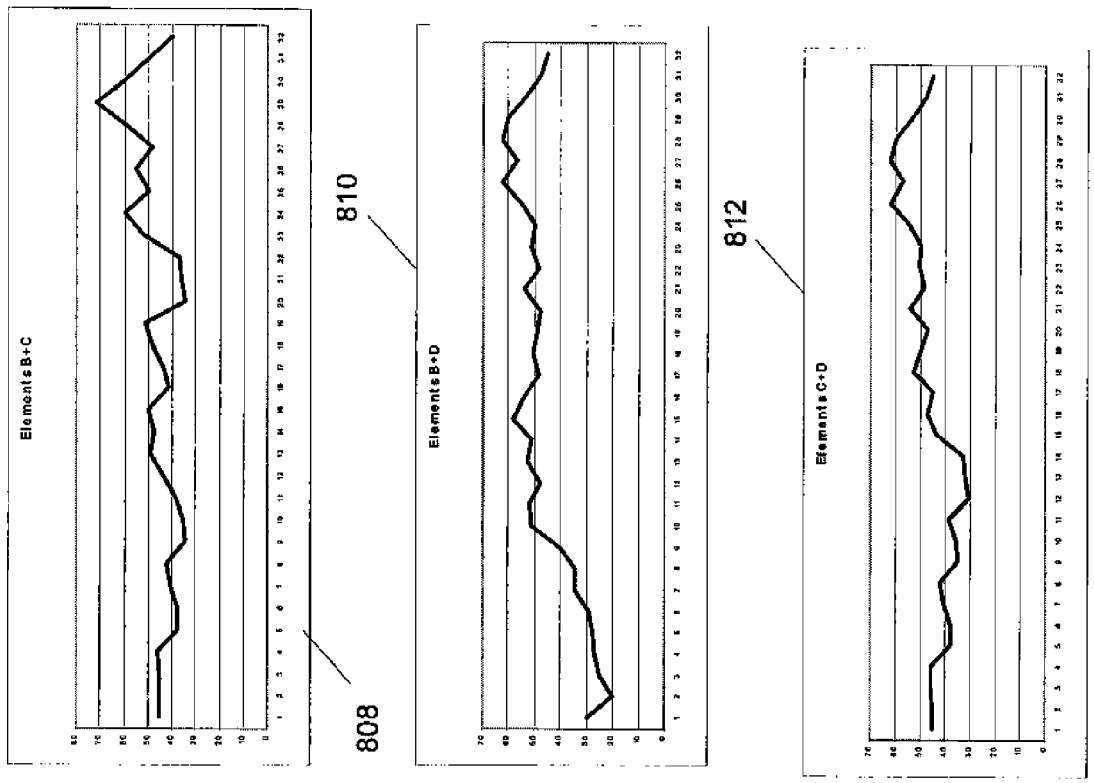
FIG. 8 is a set of charts graphically illustrating the relative "performance" of the various combinations of antennas.
Figure 8:
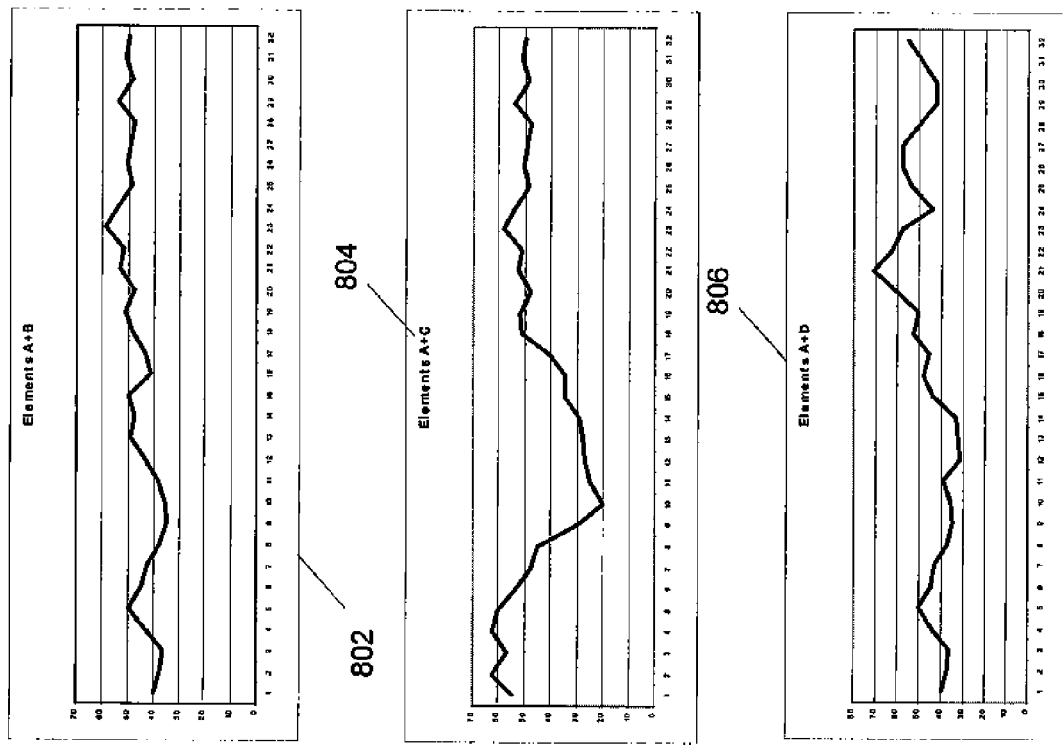

FIG. 8 is a set of charts graphically illustrating the relative "performance" of the various combinations of antennas. As shown in FIG. 8, there is a chart for the combinations of antennas A and B 802, antennas A and C 804, antennas A and D 806, antennas B and C 808, antennas B and D 810, and antennas C and D 812. Inspection of the charts of FIG. 8 shows that the combination of antennas A and B 802 is the flattest response across all of the bins. Further, the combination of antennas A and B 802 is flatter than either antenna A or B individually, 702 and 704 in FIG. 7 respectively. This example illustrates graphically how the combination of antennas can have preferred performance characteristics over individual antennas that make up the combination.

Various illustrative implementations of the present invention have been described. However, one of ordinary skill in the art will see that additional implementations are also possible and within the scope of the present invention. For example, while the above description describes specific examples for determining which antennas within an array of antennas to use for radio communication by a control module, these aspects can be performed by other types of controllers and be within the scope herein.

Accordingly, the present invention is not limited to only those implementations described above. Those of skill in the art will appreciate that the various illustrative modules and method steps described in connection with the above described figures and the implementations disclosed herein can often be implemented as electronic hardware, software, firmware or combinations of the foregoing. To clearly illustrate this interchangeability of hardware and software, various illustrative modules and method steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module or step is for ease of description. Specific functions can be moved from one module or step to another without departing from the invention.

Moreover, the various illustrative modules and method steps described in connection with the implementations disclosed herein can be implemented or performed with a general purpose processor, a digital signal processor ("DSP"), an application specific integrated circuit ("ASIC"), field programmable gate array ("FPGA") or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the implementations disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed implementations is provided to enable any person skilled in the art to make or use the invention. Various modifications to these implementations will be readily apparent to those skilled in the art, and the generic principles described herein can be applied to other implementations without departing from the spirit or scope of the invention. Thus, it is to be understood that the description and drawings presented herein represent example implementations of the invention and are therefore representative of the subject matter which is broadly contemplated by the present invention. Thus, the invention is not intended to be limited to the embodiments show herein, but is to be accorded the widest scope consistent with the appended claims.

The invention claimed is:

1. An antenna system for use in an orthogonal frequency division multiplexing (OFDM) communication system, the antenna system comprising:
   a plurality of antennas;
   a switch matrix in communication with the plurality of antennas and adapted to couple selected antennas to a plurality of switch outputs;
   a radio module in communication with a first switch output and adapted to receive OFDM radio frequency signals;
   a measurement module in communication with the radio module, and adapted to measure the bin magnitudes of the OFDM radio frequency signals received by the radio module; and
   a control module adapted to control selection of which of the plurality of antennas is coupled to the first switch output, wherein during a selection phase the control module selectively couples a desired antenna to the first switch output and receives the measured bin magnitudes of the OFDM radio frequency signal received by the selected antenna, the control module continues selecting and receiving measurements from a desired number of the plurality of antennas, then the control module combines the measurements from combinations of the antennas and determines a desired combination of antennas for use during an operational phase,
   wherein the desired combination of antennas has preferred performance characteristics over individual antennas that make up the desired combination, and
   wherein the control module during the selection phase selects antennas one at a time and ranks the antennas based upon the measured characteristics.

2. The antenna system of claim 1, wherein the combinations of antennas includes measurements from at least four antennas.

3. The antenna system of claim 1 further comprising:
   a second switch output; and
   a second radio module in communication with the second switch output, wherein the control module selects one antenna to be communicatively coupled to the radio module and a second antenna to be communicatively coupled to the second radio module, wherein the OFDM radio signal received by the second radio are communicated to the measurement module.

4. The antenna system of claim 3, wherein measurements of the OFDM radio signal received by the radio module and the second radio module are made simultaneously by the measurement module.

5. A method of selecting a set of antennas from a plurality of antennas for use with a radio system having a plurality of radios operating in an orthogonal frequency division multiplexing (OFDM) communication system, the method comprising:
   selecting one antenna within an array of antennas;
   measuring the bin magnitudes of OFDM radio signals received at the antenna;

repeating selecting, and measuring, on a desired number of antennas within the array, wherein the selecting and measuring of antennas is performed one at a time;

combining the measurements of the measured bin magnitudes from the antennas into a plurality of combination measurements;

ranking the antenna combinations based upon the combination measurements; and selecting a desired combination of antennas for use during operation of the radio system, wherein the desired combination of antennas has preferred performance characteristics over individual antennas that make up the desired combination.

6. The method of claim 5, wherein the measuring occurs in the frequency domain.

7. The method of claim 5, wherein measuring bin magnitudes of the OFDM radio signal is performed in the frequency domain.

8. The method of claim 5, wherein combining the measurements of the measured bin magnitudes from the antennas into a plurality of combination measurements further comprises combining signals received from two or more antennas and then measuring a degree of correlation of an amble in the combined signal to a known amble.

9. The method of claim 5, wherein measuring further comprises measuring a signal to noise ratio.

10. The method of claim 5, wherein measuring further comprises measuring a carrier to signal ratio.

11. The method of claim 5, wherein measuring further comprises a signal fade measurement.

12. The method of claim 5, further comprising:
determining a phase of signals received from the desired number of antennas; and
adjusting the phase of the signals of the selected set of antennas.

13. The method of claim 5, further comprising:
determining a timing of signals received from the desired number of antennas; and
adjusting the timing of the signals of the selected set of antennas.

14. An antenna system comprising:
an array of antennas;
a switch matrix in communication with the array of antennas and adapted to couple selected antennas to a plurality of switch outputs;
a radio module in communication with a first switch output and adapted to receive OFDM radio frequency signals;
a measurement module in communication with the radio module, and adapted to measure characteristics of the OFDM radio frequency signals received by the radio module, wherein the characteristics include the bin magnitudes of the OFDM radio frequency signals; and
a control module adapted to control the switch matrix to selectively couple a desired antenna to the first switch output and receives the measured characteristics of the radio frequency signal received by the selected antenna, the control module continues selecting and receiving measurements from a desired number of the plurality of antennas, then combining the measurements of the plurality of antennas into a plurality of combination measurements and based upon the combination measurements, providing independent communication streams from selected combinations of antennas to a receiver,
wherein the control module, during the selection phase, selects antennas one at a time; and
wherein the selected combinations of antennas have preferred performance characteristics over individual antennas that make up the selected combinations.

15. The antenna system of claim 14, wherein the measuring occurs in the frequency domain.

16. The antenna system of claim 14, wherein measuring characteristics of the radio signal further comprises measuring a degree of correlation of an amble in the signal to a known amble.

17. The antenna system of claim 14, wherein measuring characteristics of the radio signal further comprise measuring a degree of correlation of an amble in the signal to a known amble.

18. The antenna system of claim 14, wherein measuring characteristics of the radio signal further comprises an error vector measurement.

19. The antenna system of claim 14, wherein measuring characteristics or the radio signal further comprises measuring a signal to noise ratio.

20. The antenna system of claim 14, wherein measuring characteristics of the radio signal further comprises measuring a carrier to signal ratio.

21. The antenna system of claim 14, wherein combining the measurements of the plurality of antennas into a plurality of combination measurements comprises combing the measurements for pairs of antennas.

22. The antenna system of claim 14, wherein measuring characteristics of the radio signal further comprises measuring the phase of the radio signal.

23. The antenna system of claim 14, wherein measuring the characteristics of the radio signal further comprises measuring the timing of the radio signal.

24. A method of selecting a set of antenna from an array of antennas, the method comprising:
selecting an antenna within an array of antennas;
measuring characteristics of an orthogonal frequency division multiplexed (OFDM) radio signals received at the selected antenna, wherein the characteristics include the bin magnitudes of the OFDM radio frequency signals;
repeating selecting, and measuring, on a desired number of antennas within the array, wherein the selecting and measuring of antennas is performed one at a time;
combining the measurements of selected antennas into a plurality of combination measurements;
ranking the combinations of antenna base upon the combination measurements; and
selecting combinations of antennas to thereby provide independent communication streams from the combinations to a receiver,
wherein the selected combinations of antennas have preferred performance characteristics over individual antennas that make up the selected combinations.

25. The method of claim 24, wherein the measuring occurs in the frequency domain.

26. The method of claim 24, wherein measuring characteristics of the radio signal further comprises measuring a degree or correlation of an amble in the signal to a known amble.

27. The method of claim 24, wherein measuring characteristics of the radio signal further comprise combining signals received from two or more antennas and then measuring a degree of correlation of an amble in the combined signal to a known amble.

28. The method of claim 24, wherein measuring characteristics of the radio signal further comprises an error vector measurement.

29. The method of claim 24, wherein measuring characteristics of the radio signal further comprises measuring a signal to noise ratio.

30. The method of claim 24, wherein measuring characteristics of the radio signal further comprises measuring a carrier to signal ratio.

31. The method of claim 24, wherein measuring characteristics of the radio signal further comprises a signal fade measurement.

32. The method of claim 24, further comprising:
determining a phase of signals received from the desired number of antennas; and
adjusting the phase of the signals of the selected set of antennas.

33. The method of claim 24, further comprising:
determining a timing of signals received from the desired number of antennas; and
adjusting the timing of the signals of the selected set of antennas.

34. An antenna system for use in an orthogonal frequency division multiplexed (OFDM) communication system, the antenna array comprising:
an array of antennas;
a switch matrix in communication with the array of antennas and adapted to couple selected antennas to a plurality of switch outputs;
a radio module in communication with a first switch output and adapted to receive OFDM radio frequency signals;
a measurement module in communication with the radio module, and adapted to measure characteristics of the OFDM radio frequency signals received by the radio module, the characteristics including the bin magnitudes of the received OFDM radio frequency signals; and
a control module adapted to control the switch matrix to selectively couple a desired antenna to the first switch output and receives the measured characteristics of the radio frequency signal received by the selected antenna, the control module continues selecting and receiving measurements from a desired number of the plurality of antennas, then combining the measurements of the plurality of antennas into a plurality of combination measurements and based upon the combination measurements, providing independent communication streams from selected antennas to a receiver,
wherein the control module during the selection phase selects antennas one at a time; and
wherein the communication streams from selected antennas have preferred performance characteristics over communication streams from individual antennas.

35. The antenna system of claim 34, wherein the independent communication streams are baseband signals.

36. The antenna system of claim 34, wherein the independent communication streams are RF signals.

37. The antenna system of claim 34, wherein the independent communication streams are frequency domain signals.

38. A method of selecting a set of antenna from an array of antennas, the method comprising:
selecting an antenna within an array of antennas;
measuring characteristics of orthogonal frequency division multiplexed (OFDM) radio signals received at the selected antenna, where the characteristics comprise bin magnitudes;
repeating selecting, and measuring, on a desired number of antennas within the array, wherein the selecting and measuring of antennas is performed one at a time;
combining the measurements of selected pairs antennas into a plurality of combination measurements;
ranking the combinations of antenna base upon the combination measurements; and
selecting combinations of antennas to thereby provide independent communication streams to a receiver,
wherein the selected combinations of antennas have preferred performance characteristics over individual antennas that make up the selected combinations.

39. The antenna system of claim 38, wherein providing independent communication streams comprises providing baseband signals.

40. The antenna system of claim 38, wherein providing independent communication streams comprises providing RF signals.

41. The antenna system of claim 38, wherein providing independent communication streams comprises providing frequency domain signals.

* * * * *